United States Patent [19]

Sarka

BEST AVAILABLE COPY

[11] 3,895,947

[45] July 22, 1975

[54] METHOD OF MAKING DIE PLATES

[75] Inventor: Albert J. Sarka, Fairview Park, Ohio

[73] Assignee: Harris-Intertype Corporation, Cleveland, Ohio

[22] Filed: Jan. 9, 1974

[21] Appl. No.: 432,035

Related U.S. Application Data

[63] Continuation of Ser. No. 159,961, July 6, 1971, abandoned.

[52] U.S. Cl. .......................... 96/36; 96/382; 96/41; 156/3; 76/107

[51] Int. Cl. .......................... G03c 5/00

[58] Field of Search .............. 96/36, 27 R, 38.2, 41; 76/107; 156/3

[56] References Cited

UNITED STATES PATENTS

| | | | |
|---|---|---|---|
| 2,999,016 | 9/1961 | Beeber et al. | 96/75 |
| 3,341,329 | 9/1967 | Blake | 96/36 |
| 3,352,728 | 11/1967 | Stein et al. | 156/3 |
| 3,535,955 | 10/1970 | Otto et al. | 96/36 |
| 3,592,651 | 7/1971 | Klemm et al. | 96/36 |
| 3,661,577 | 5/1972 | Klemm et al. | 96/36 |

*Primary Examiner*—Norman G. Torchin
*Assistant Examiner*—Edward C. Kimlin

[57] ABSTRACT

The present invention relates to a method of making die plates having lands thereon which project from the main body of the die plate and which form material, and in particular the present invention relates to the manufacture of die plates which effect a cutting and/or creasing of sheet-like material by the lands formed thereon.

30 Claims, 29 Drawing Figures

INVENTOR
ALBERT J. SARKA
BY Yount and Tarolli
ATTORNEYS

INVENTOR
ALBERT J. SARKA
BY Young and Tarolli
ATTORNEYS

PATENTED JUL 22 1975

3,895,947

SHEET 3

INVENTOR
ALBERT J. SARKA

BY Yount and Tarolli
ATTORNEYS

INVENTOR
ALBERT J. SARKA
BY Yount and Tarolli
ATTORNEYS

INVENTOR
ALBERT J. SARKA
BY Yount and Tarolli
ATTORNEYS

INVENTOR
ALBERT J. SARKA
BY Yount and Tarolli
ATTORNEYS

INVENTOR
ALBERT J. SARKA
BY Yount and Tarolli
ATTORNEYS

INVENTOR
ALBERT J. SARKA
BY Yount and Tarolli
ATTORNEYS

INVENTOR
ALBERT J. SARKA
BY Young and Tarolli
ATTORNEYS

METHOD OF MAKING DIE PLATES

This is a continuation, of application Ser. No. 159,961 filed July 6, 1971, now abandoned.

BACKGROUND OF THE INVENTION

Die plates which are used for purposes of cutting and/or creasing sheet-like material are known. Downie U.S. Pat. No. 3,170,342 discloses such cutting and creasing die plates. The die plates disclosed in the Downie patent are made of a homogenous material and include a base with projecting lands which extend therefrom. For purposes of creasing, one of the die plates (the female die) has a pair of closely spaced lands, whereas the other die plate (the male die) has a single land which forces material into the space between the lands on the female die to effect a creasing thereof. The cutting is effected by cutting lands which extend from the die plates and have an overlapping area in the plane of the material along the line of severance. The cutting lands effect a rupturing of the material and their operation has been termed "rupture cutting," since the lands do not touch during the cutting operation.

The lands are formed on the die plates by an etching or chemical milling process. More specifically, a light-hardenable resist coating is placed on metal plates and the resist coating is exposed to a pattern of light in dependence on the lands to be formed to harden certain areas of the resist which are to form the lands. Then the plate is etched in the unhardened areas so that the lands are formed. The resist coating is exposed through a transparency such as a positive or negative having light-transmitting lines or areas which determine the areas of the resist which are hardened. It should be obvious that it is extremely important that the transparency or negative be accurately made.

Blake U.S. Pat. No. 3,341,329 is directed to a photomechanical method for producing the dies. The method disclosed in the Blake patent, however, is not efficient from a production standpoint, and inaccuracies frequently occur in the performance of the method disclosed in the Blake patent. Accordingly, the procedure disclosed in the patent is not completely acceptable from a commercial standpoint.

The present invention is directed to a method of making the die plates and which is less susceptible of inaccuracy occurring therein, and accordingly is extremely efficient and when used substantially reduces the cost of die plates as opposed to presently known techniques for manufacturing the die plates. Accordingly, the principal object of the present invention is the provision of a new and improved method of making the afore-mentioned die plates and which method is extremely efficient and accurate.

The method of making the die plates in accordance with the present invention begins with a pattern corresponding to the shape of the material to be formed by the dies. Such a pattern may then be reproduced on an automatic drafting machine which makes a form of a negative by removing an opaque coating from a light-transmitting base sheet. The coating is removed as lines in a predetermined manner dependent upon the lands to be formed on the dies. As a result of this operation, in effect, an extremely accurate master negative or transparency of the pattern is provided having light-transmitting lines located thereon in dependence upon the pattern.

The negative is then used, in the preferred embodiment, to expose a material having a light-transmitting base sheet, which has a peelable coating which is sensitive to light. After the peelable coating is exposed, through the master negative or transparency produced on the automatic drafting machine, it is etched to form peelable areas thereon defined by the light-transmitting lines. These areas may then be selectively peeled to form a negative or transparency for purposes of exposing the resist on the die plates.

The essential features of the method of the present invention will be apparent from the description below and may be embodied in a number of different modifications, and objects and advantages will become apparent to those skilled in the art to which the invention relates from the following description of different embodiments of the present invention made with reference to the accompanying drawings in which.

Figure 6:
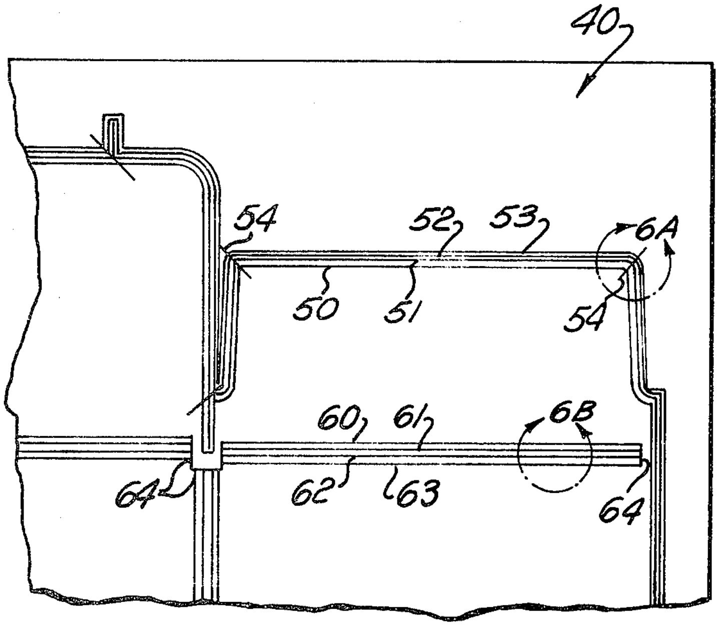
Figure 6A:
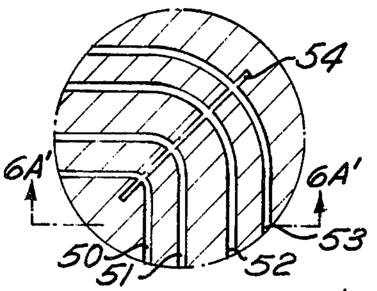
Figure 6B:
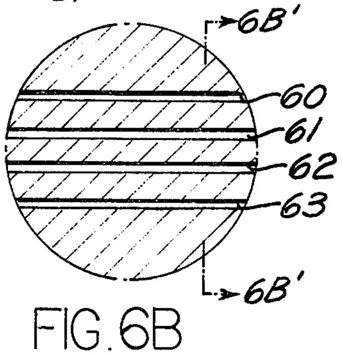
Figure 6A:
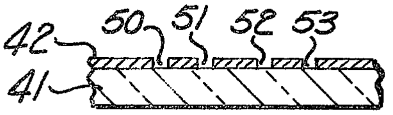
Figure 6B:
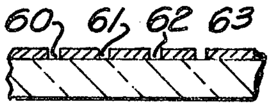
Figure 7:
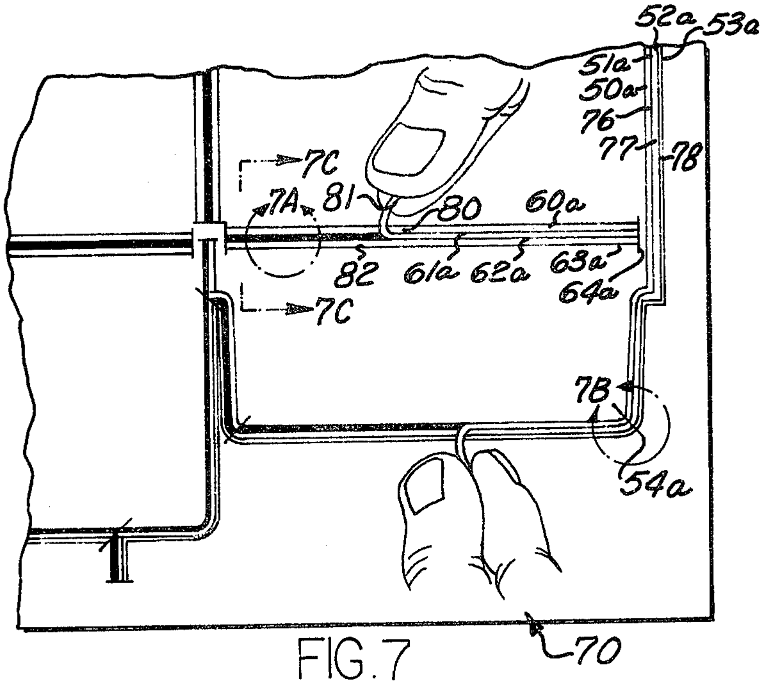
Figure 7A:
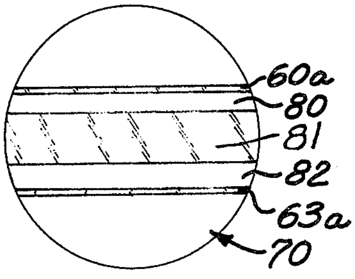
Figure 7B:
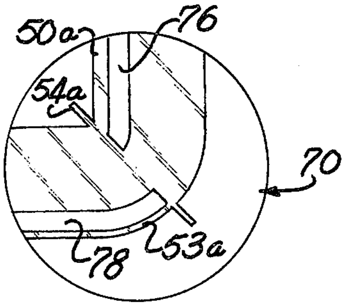
Figure 7C:
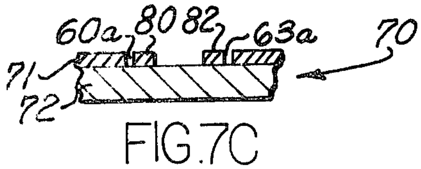
Figure 8A:
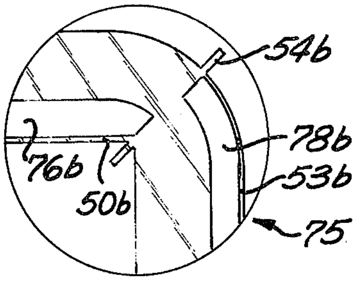
Figure 8:
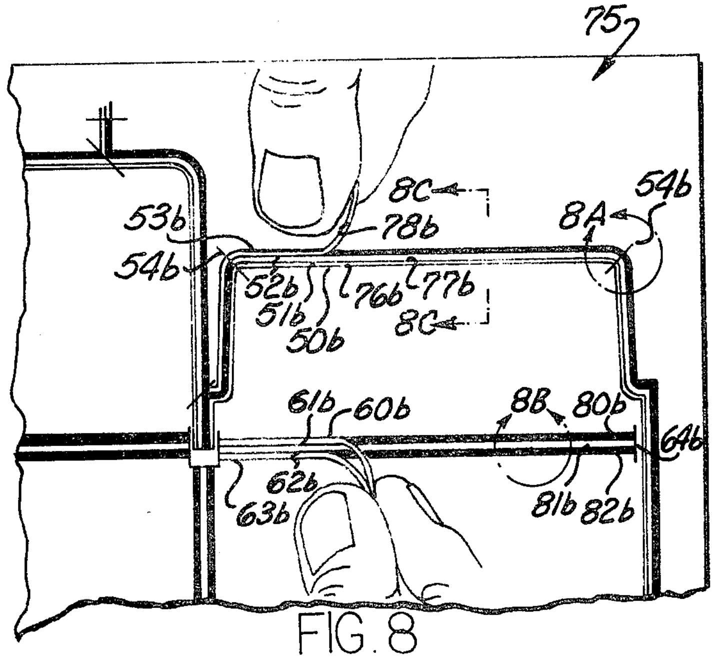
Figure 8B:
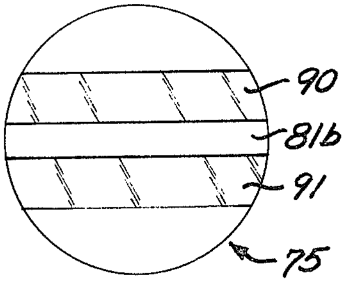
Figure 8C:
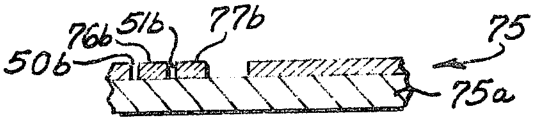
Figure 9:
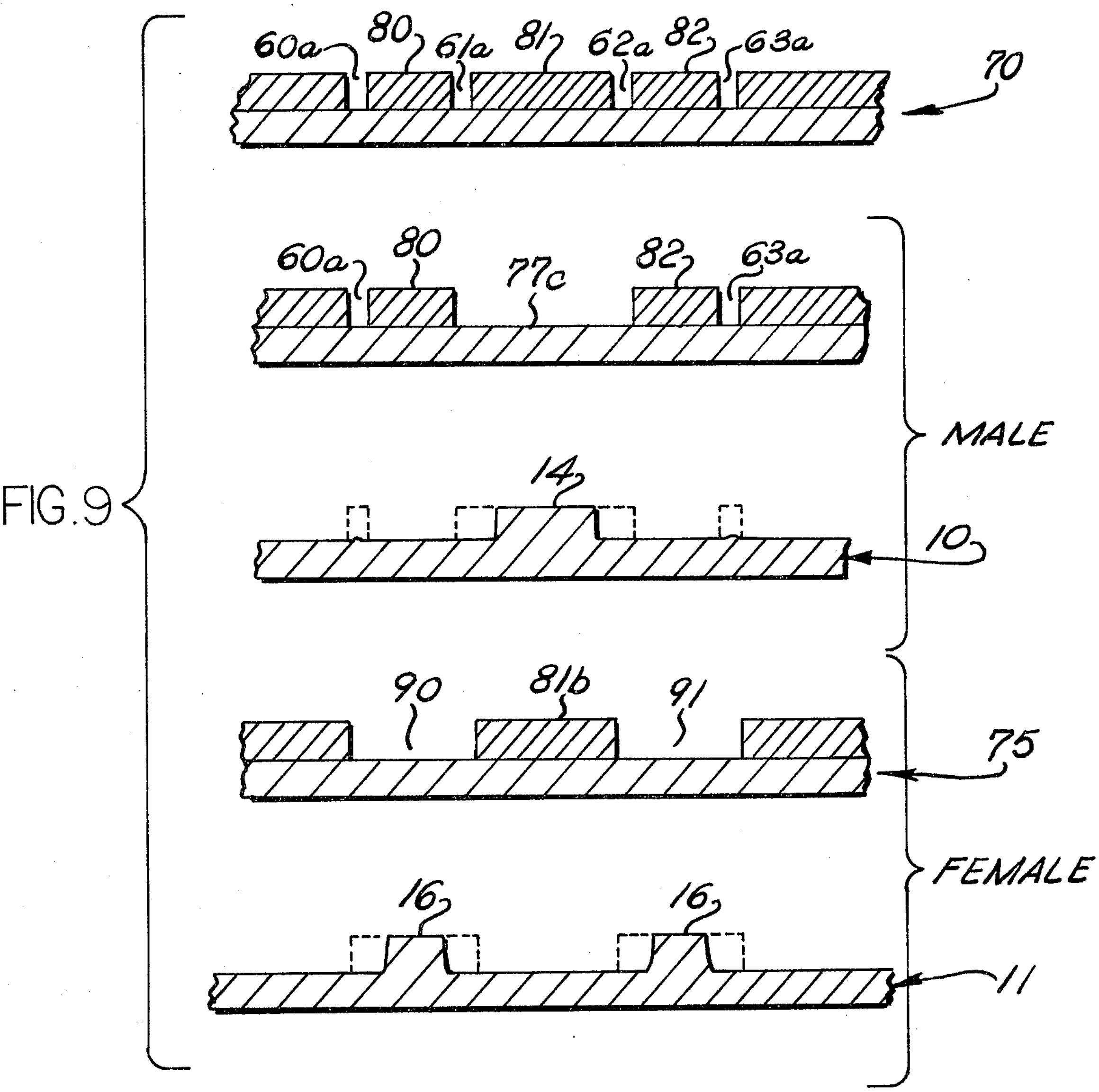
Figure 10:
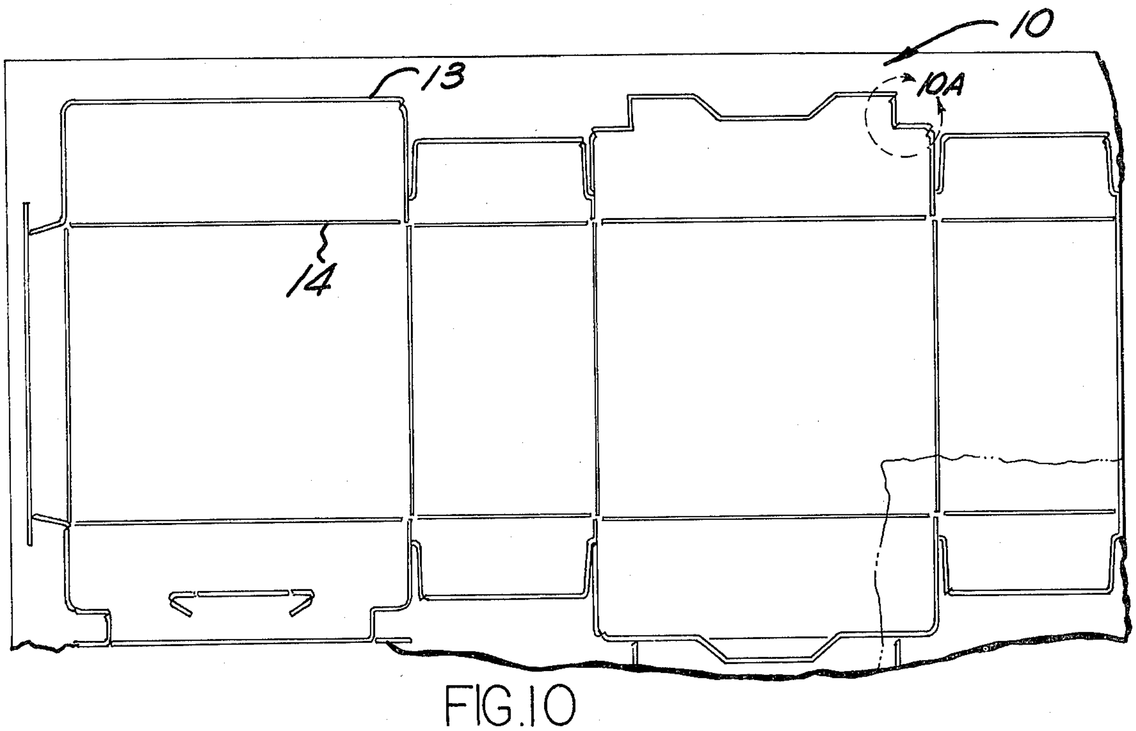
Figure 11:
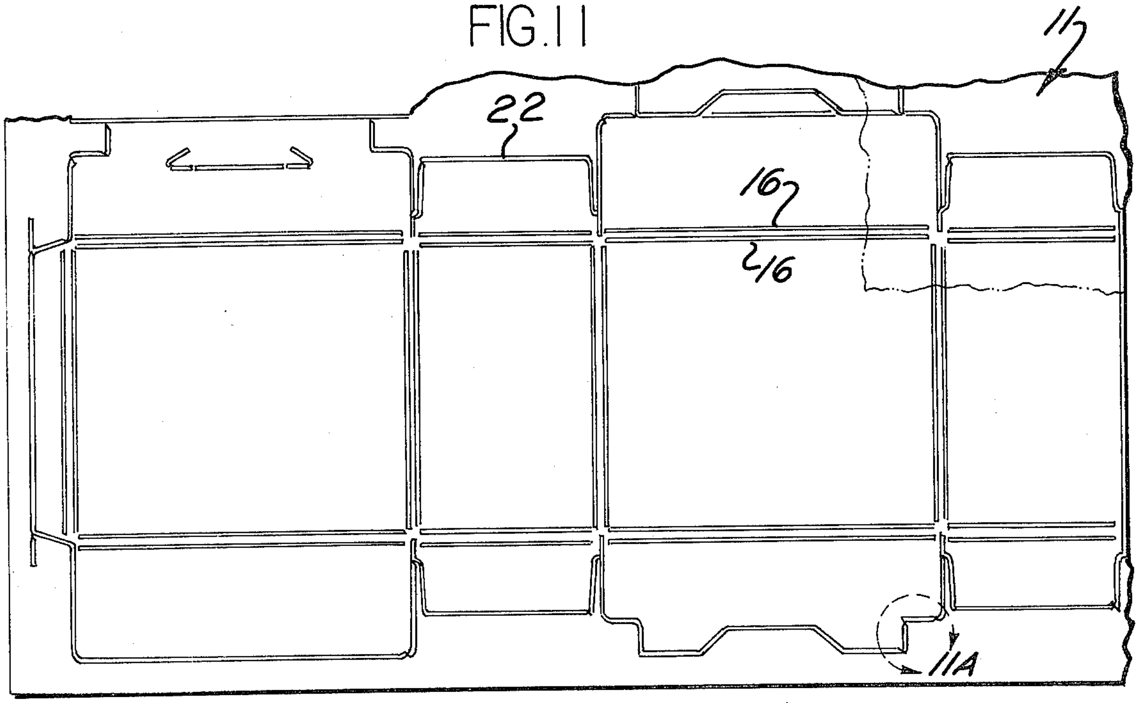
Figure 10A:
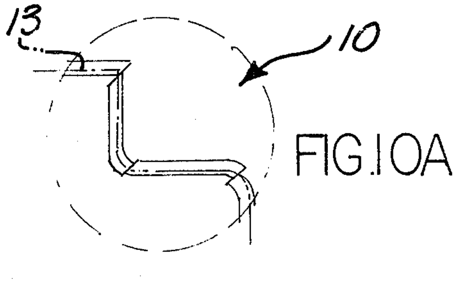
Figure 11A:
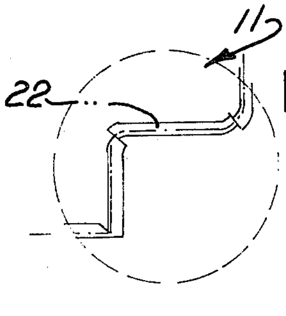
Figure 12A:
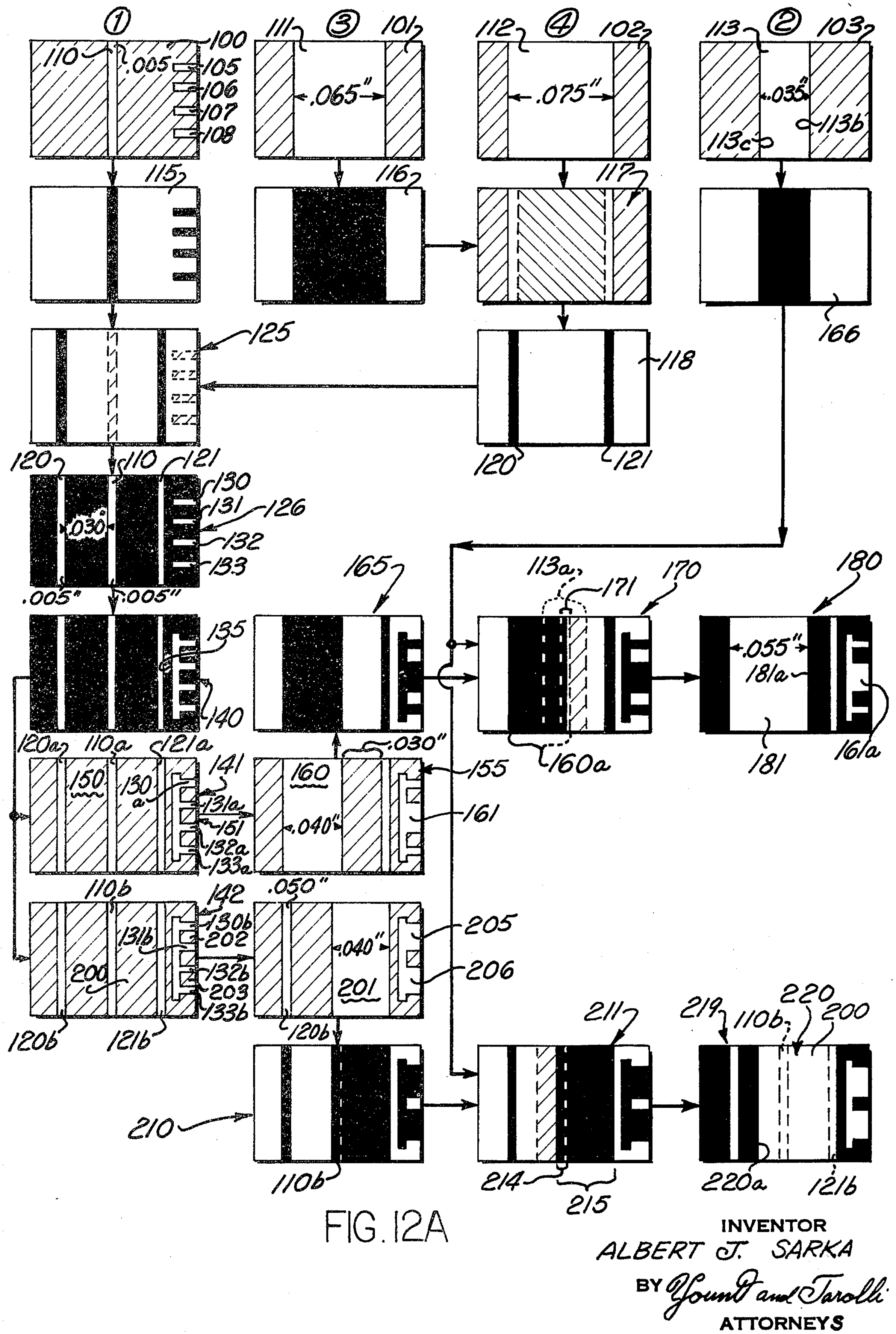
Figure 12B:
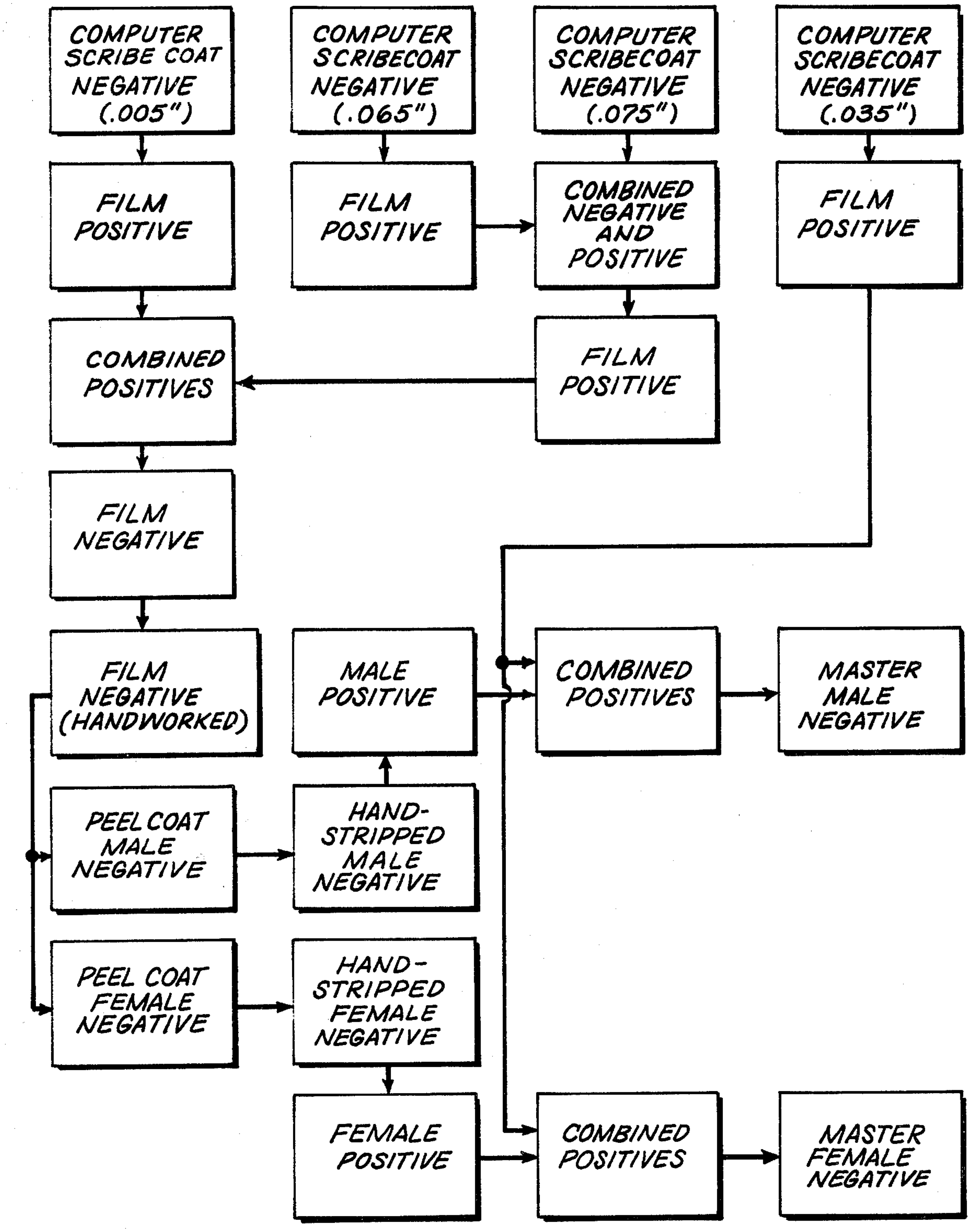
Figure 13A:
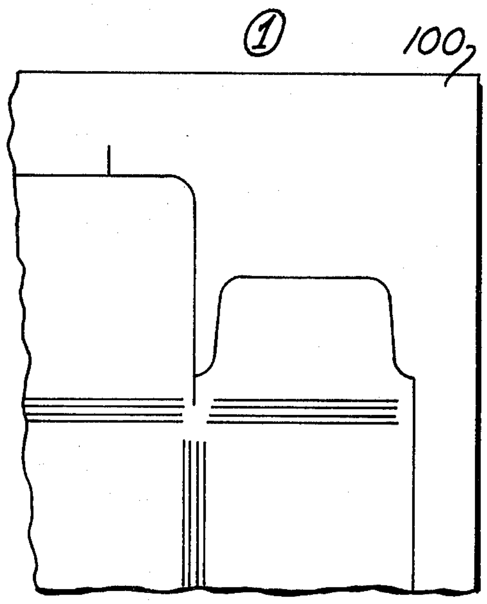
Figure 13D:
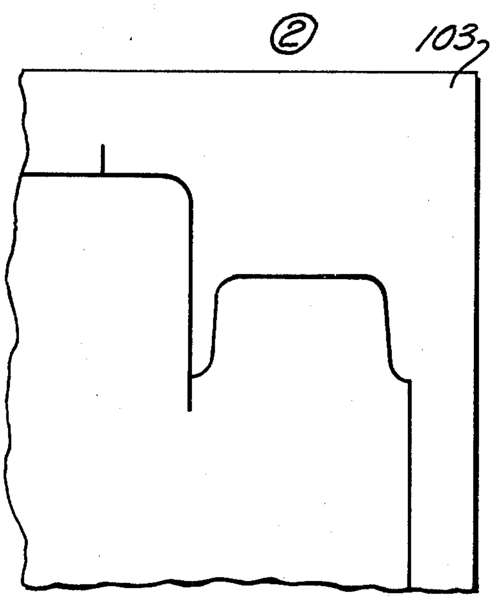
Figure 13B:
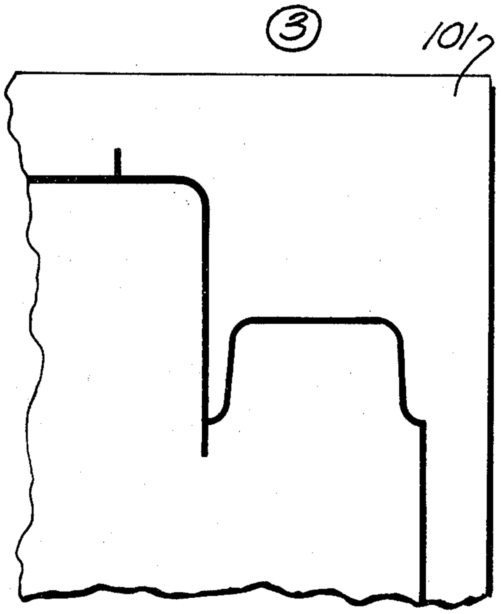
Figure 13C:
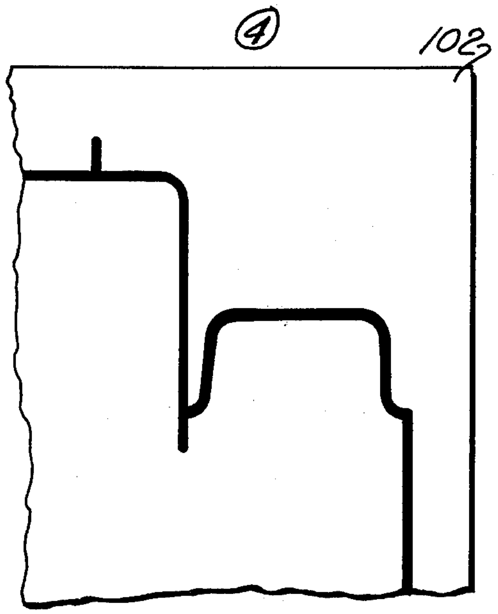

FIG. 6 discloses a portion of the material which is acted upon by the automatic drafting machine;

FIGS. 6A and 6B are enlarged fragmentary views of the respective portions designated 6A and 6B of FIG. 6;

FIGS. 6A' and 6B' are sectional views taken approximately along the line 6A'—6A' of FIG. 6A and 6B'—6B' of FIG. 6B;

FIG. 7 illustrates a further step in the process of making the male die plate and illustrates a material having selectively peelable areas and which is formed by exposure from the material of FIG. 6;

FIGS. 7A and 7B are enlarged fragmentary views of the areas 7A and 7B of FIG. 7;

FIG. 7C is a sectional view taken approximately along the line 7C—7C of FIG. 7;

FIG. 8 is a view, similar to that of FIG. 7, and illustrates material which is formed by exposure from the material of FIG. 6 and which is to be used in the formation of the female die;

FIGS. 8A and 8B are enlarged fragmentary views illustrating portions 8A and 8B of FIG. 8;

FIG. 8C is a sectional view taken approximately along the section line 8C—8C of FIG. 8;

FIG. 9 is a schematic view illustrating various steps in the process of forming the dies from the material shown in FIGS. 7 and 8;

FIG. 10 is a fragmentary plan view of the finished male die;

FIG. 10A is an enlarged fragmentary view of a portion of the male die of FIG. 10, designated 10A;

FIG. 11 is a fragmentary plan view of the female die;

FIG. 11A is an enlarged view of the area designated 11A in FIG. 11;

FIGS. 12A and 12B illustrate a modified method embodying the present invention; and FIGS. 13A to 13D illustrate four separate negatives which are made on the drafting machine from a single computer program and used in the method of FIGS. 12A and 12B.

Figure 1:
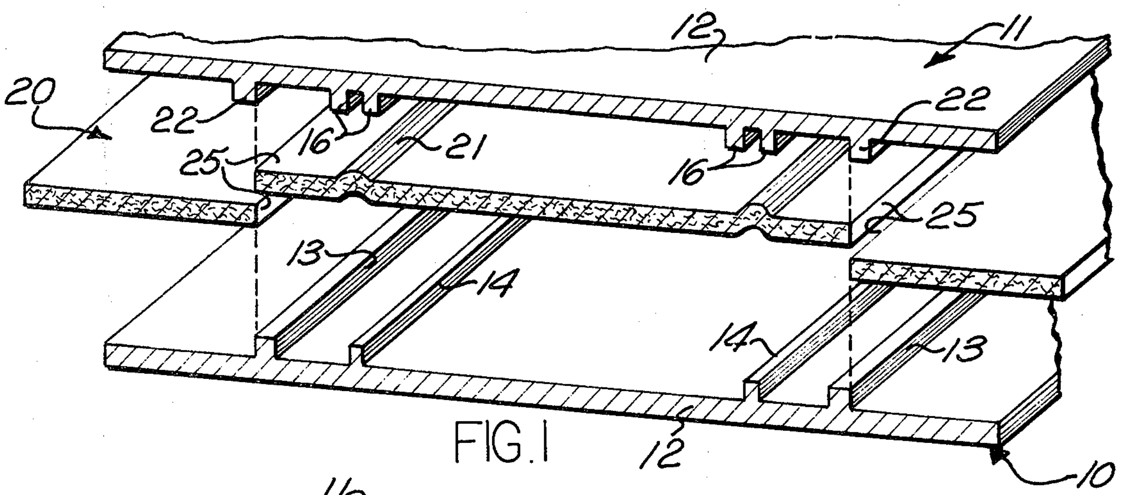
FIG. 1 illustrates dies made in accordance with the present invention and material being worked upon by the dies.

Referring now to FIG. 1, a male die 10 is shown, as well as a female die 11 which cooperates with the male die 10. Preferably, the dies 10, 11 are made of a homogeneous metal material. The male die 10 includes a base portion 12 and projecting cutting lands 13 thereon. The male die also has creasing lands 14 which project from the body 12. The female die 11 includes a pair of projecting land elements 16 which define a space therebetween into which the male element 14 forces material which is advanced between the dies and thereby effects a creasing or scoring of the material. The female die 11 also includes severing lands 22. Each severing land 22 cooperates with a severing land 13 on the male die 10 and effects a severing of the material in accordance with the aforementioned Downie patent.

Figure 3:
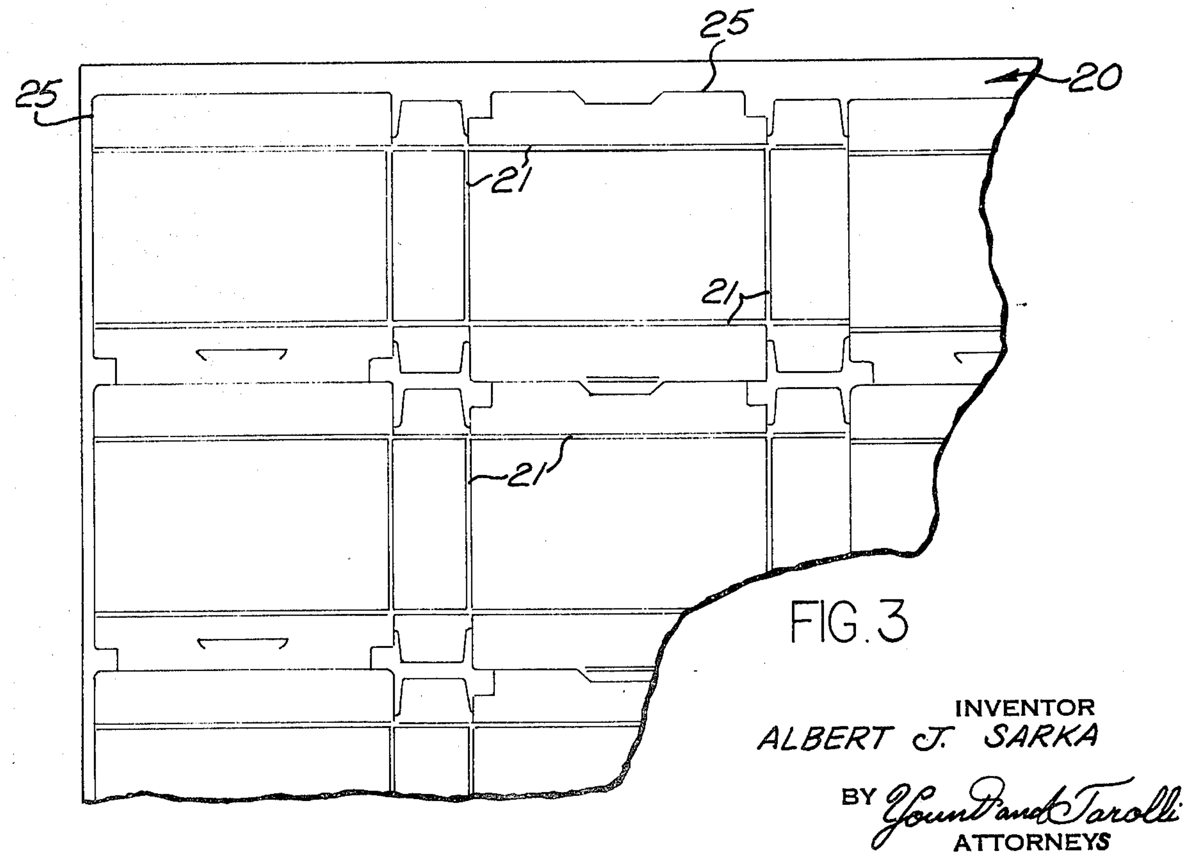
FIG. 3 is a plan view of a sheet of material which has been cut into a plurality of cartons by the dies made in accordance with the present invention, before the waste material and cartons have been separated.

The material which is formed by the dies is shown and designated 20 in the drawings. Crease lines, commonly referred to as scores, are illustrated at 21 in the material and cut or sever lines at 25. Preferably, the dies 10, 11 work on sheet material to form a plurality of carton blanks therefrom. FIG. 3 illustrates a plan view of a section of a sheet of material 20 having carton blanks cut therefrom. The creased lines, designated 21 are shown as double lines, while the cut lines 25 are shown as being single lines.

Figure 2:
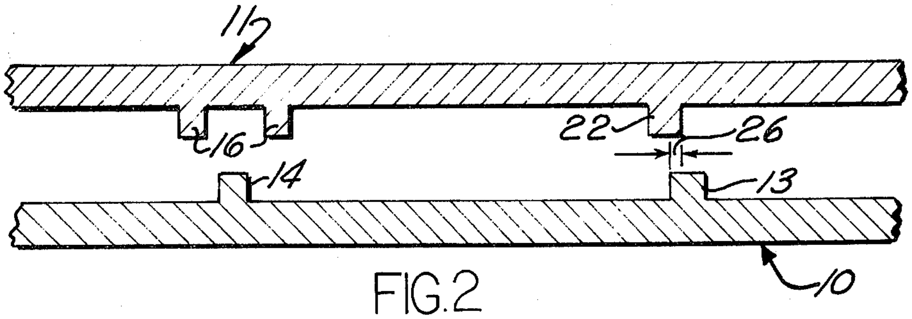
FIG. 2 illustrates a cross-sectional view of the dies embodying the present invention.

FIG. 2 illustrates a cross section of a cooperating pair of dies and illustrates the fact that the male die plate 10 has its creasing element 14 located between or in the space bbetween the female creasing elements 16 carried by the female die 11. In addition, FIG. 2 illustrates that the severing elements 13 on the male die plate and severing elements 22 on the female die plate have an overlapping portion in the plane of the material. The overlapping portion is designated 26 in FIG. 2. The severing elements are referred to in the art as effecting a "rupturing" of the material. The dies 10 and 11 move toward each other to operate on a sheet of paperboard. However, the severing elements do not come in contact with each other during the cutting of the material, but rather remain slightly spaced apart and due to the overlapping area 26, effect the rupture cut of the material, as is known.

Figure 4:
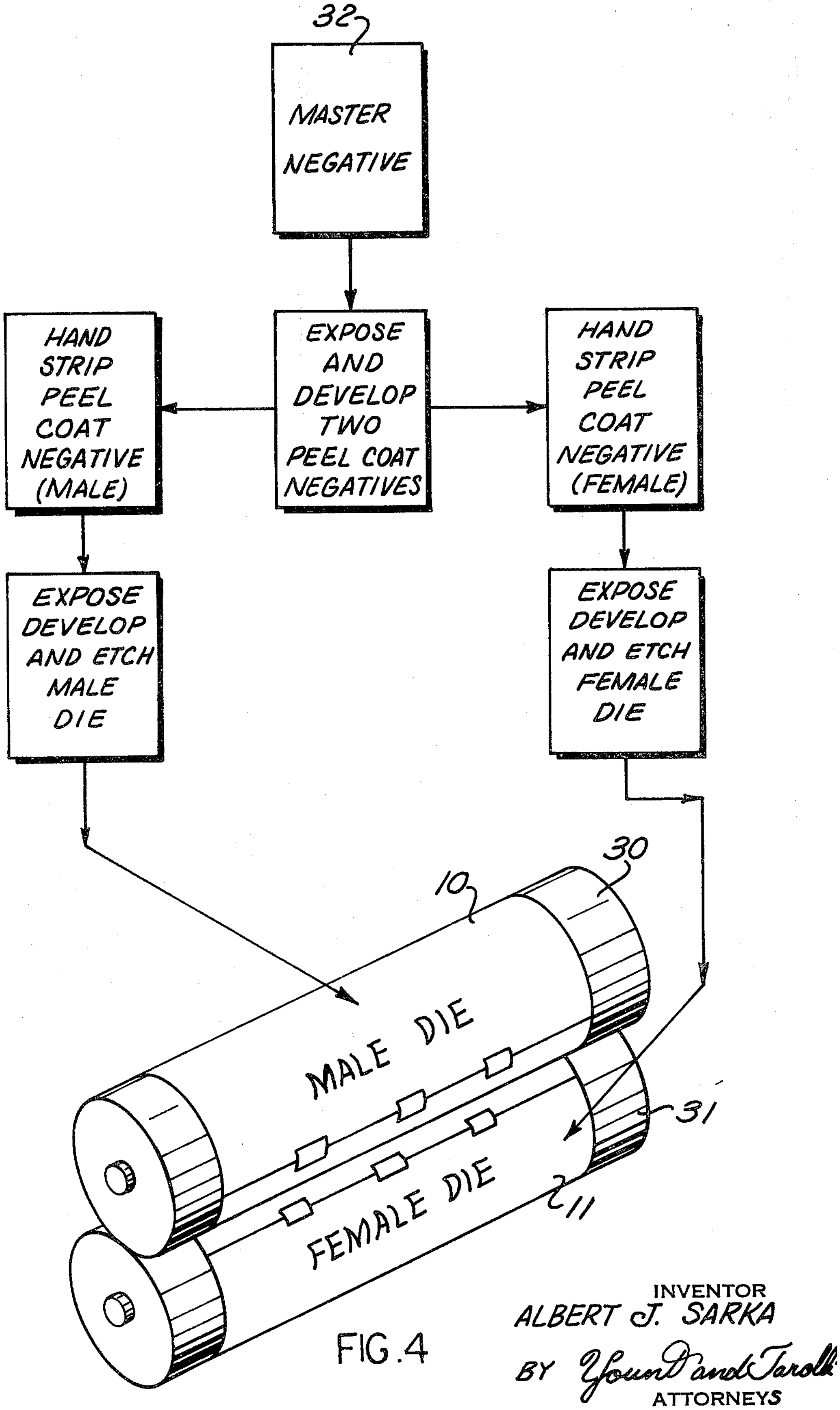
FIG. 4 is a general schematic view which discloses generally the steps performed in manufacturing the dies of FIG. 1.

The dies 10, 11, while illustrated in FIGS. 1 and 2 in the flat, are preferably flexible and can be bent or curved. It should be understood however, that the technology herein discussed is applicable also, with some modifications, to placing of the cutting and creasing lands directly onto a solid member, such as a cylinder. A common manner in which the dies 10, 11 are used is to mount the dies on cylinders 30, 31, as shown in FIG. 4. Material in sheet form is then advanced through the nip defined by the cylinders 30, 31 and the cooperating lands on the dies effect the cutting and creasing of the material as it advances through the nip. The dies may be formed so that from a given sheet of material, a plurality of cartons are cut. FIG. 3 illustrates the sheet of paperboard material 20 and carton blanks in an interlocking relationship disclosed as being cut from the single sheet of material 20. A single pair of dies cuts the plurality of carton blanks from the material 20. It should be apparent, of course, from the description hereinabove that the lands on the die plates must be extremely accurately located so that they properly cooperate with each other so that the desired carton blank is formed from the sheet material 20. Failure of complete cutting to take place anywhere on the sheet will cause machine jam-ups which may require scrapping of the entire set of dies.

In making the die plates 10 and 11, the carton blank to be manufactured is designed by the appropriate carton designer and a master negative, to be described hereinbelow in greater detail, is made in dependence upon the carton blank to be manufactured. Referring to the schematic flow diagram (FIG. 4), the block, designated 32, represents the formation of the master negative of a carton. This master negative is provided with lines representative of both the laterally offset and overlapping cutting lands and the laterally staggered, male and female creasing lands. That master negative is then used to expose and develop two identical negatives which are made of a base material with a peelable coating thereon, and which are termed herein as Peel Coat negatives. One of the Peel Coat negatives has selected areas manually removed for purposes of making the male die 10, and the other Peel Coat negative has different areas manually removed for purposes of making the female die 11. The Male Peel coat negative is then used for exposing a photographic resist coating on a metal plate, which coating is light hardenable. That metal plate is then chemically etched to form the male die 10. The hand-stripped Peel Coat negative for forming the female die is likewise used in exposing a light hardenable resist coating on a plate and that plate is then etched for purposes of making the female die 11. Those dies are then mounted on the cylinders 30, 31 and used for purposes of forming the carton blanks from the sheet material.

The pattern from which the entire operation begins is made by the carton designer who lays out not only the outline of the carton, but also the scoring lines. The pattern is dictated by commercial aspects and the machinery which is to be used to fold the carton blank into the final carton. Accordingly, the pattern which is provided as the beginning of the operation or method for forming the male and female dies corresponds to the shape of the carton blank to be formed by the dies including the shape or position of the creasing lines on the blank, as well as the general outline shape of the blank to be formed by the dies. After the pattern is made, the pattern is used for purposes of putting input data into an automatic drafting machine, illustrated in FIG. 5, so that the pattern can be reproduced by the drafting machine. The input data can be fed into the drafting machine in any suitable well-known manner. For example, appropriate measurements and dimensions may be taken from the pattern and stored in the automatic drafting machine. A conventional method of feeding the data corresponding with the pattern into the automatic drafting machine is the so-called and well-known digitizing process. Digitizing is a process which involves the movement of a scanner along the lines defining the pattern and the appropriate storage information is stored as the scanner moves. After the information is stored in the drafting machine, the drafting machine can then be utilized to reproduce the pattern or slight variations thereof, as will be described below. An alternate, and in some respects, preferable approach is to write a computer program corresponding to the shape of the carton, and to have the drafting machine follow the program instructions.

The input data which is placed into the automatic drafting machine is then used for operating the drafting machine in order to provide the master negative which is broadly shown in block 32 of FIG. 4. A portion of the master negative is shown in FIG. 6 and is generally designated 40.

The master negative is made from well-known material, known as Scribe Coat which includes a base sheet 41 (FIG. 5A) of a highly stable, light-transmitting material such as plastic film or the like. On the base sheet 41 is a coating 42 which is of a suitable photographically opaque substance. This material is marketed by Keuffel and Esser Company and is described in U.S. Pat. No. 2,999,016.

Figures 5, 5A:
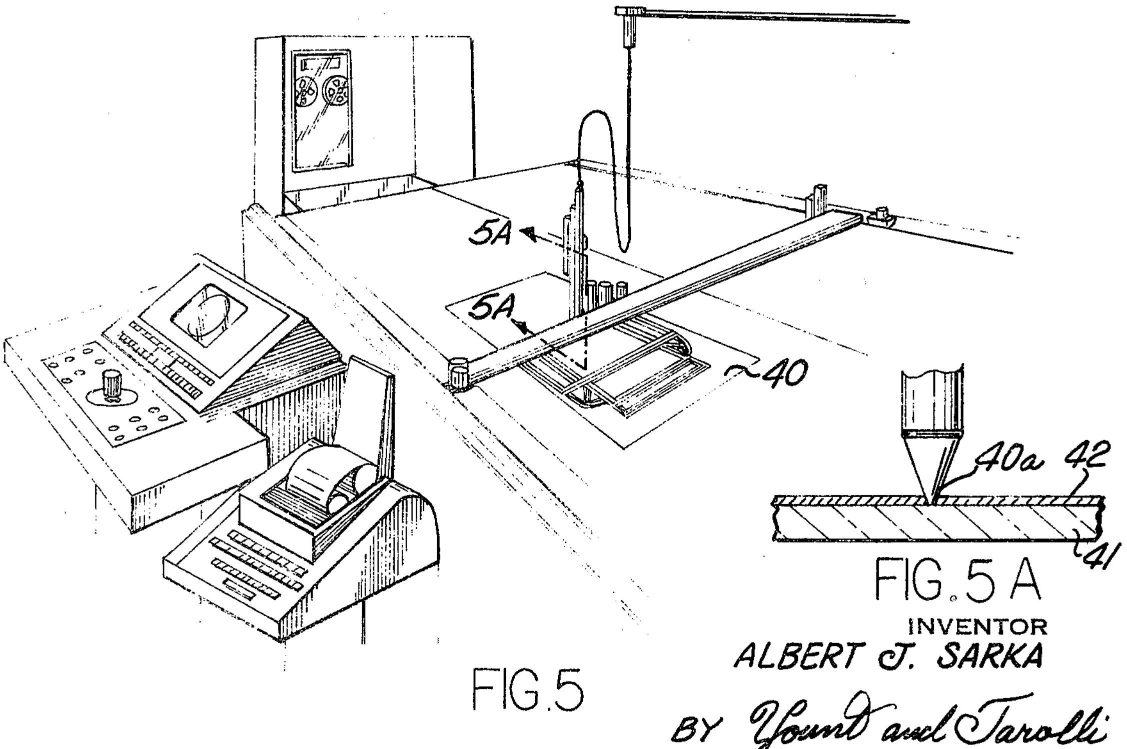
FIG. 5 is a schematic view of an automatic drafting machine which is used in the process embodying the present invention.
FIG. 5A shows a schematic view of a tool on the drafting machine removing a part of the coating of a material.

The coating 42 which is on the base sheet 41 is readily removable therefrom by the operation of a scribe. The drafting machine is utilized to operate a scribe in accordance with the input data which is placed into the drafting machine to remove portions of the coating 42. In accordance with the embodiment shown in FIGS. 6–11, a plurality of lines are scribed on the Scribe Coat by the automatic drafting machine to form the master negative. The drafting machine scribe 40a comprises a tool which extends to a depth through the coating 42 and removes that coating to a width equal to the scribe width to form a smooth uniform line as shown in FIG. 5A.

Certain of the lines which are scribed are for purposes of forming the cutting lands on the dies 10, 11 and there are four such lines, shown in FIG. 6 and designated 50, 51, 52, 53. Lines 54 are subsequently handscribed at preselected locations across lines 50–53 for purposes which will become apparent later. The lines which are scribed for purposes of forming the creasing lands on the dies 10, 11 are also four in number and designated 60, 61, 62, 63. Lines 64 are handscribed at the ends of lines 60-63 to form the ends of peelable areas. As shown in FIGS. 6A and 6B and 6A' and 6B' in an enlarged sectional view, these lines have a discernible width and comprise a line area. By the removal of the coating 42 from the base sheet 41, the master 40 has become, in effect, a negative having lines on it which are light-transmitting.

In order for the drafting machine to operate to make the various lines, it is necessary for the drafting machine to be operated four times in order to cut the various lines, and, accordingly, suitable programming of the drafting machine must be effected in order to effect the formation of these lines on the coating. The drafting machine could be operated through four passes to cut the lines or alternatively plural lines could be formed simultaneously. Once the drafting machine has formed the various lines 50–53 and 60–63, the master negative 40 is then used to expose the so-called Peel Coat negatives for formation of the male and female dies.

The master negative 40 is placed in registry over the Peel Coat material and a suitable registering technique is utilized for registering purposes, such as a suitable pin registry system as disclosed in Norton U.S. Pat. No. 3,160,096. The master negative 40 is subjected to light so as to expose certain areas of a piece of Peel Coat material 70 (FIG. 7) which will be used in the formation of the male die 10. As discussed hereinabove, the master negative 40 has the various light-transmitting lines formed therein. During the exposure, the lines transmit light to the surface of the Peel Coat material 70. The Peel Coat material 70 has a coating 71 on the surface thereof (FIG. 7C) which is light-sensitive and when exposed to light, is affected thereby. Preferably, the film 70 is placed in a vacuum frame with the sensitizable side up. The scribed master negative 40 is placed so that the coated or opaque side of the scribed original master 40 is facing down, in contact with the sensitizable coating 71. With suitable techniques, the overall physical contact of the coated surfaces is accomplished and the coating 71 is exposed through the light-transmitting lines on the master 40.

After the Peel Coat film 70 has been exposed, it is necessary to develop the lines on the Peel Coat film. Suitable techniques for this are known. After the developing has been performed, the film is rinsed with tap water and the surface water is removed. The surface of the film is then allowed to completely dry. After the film has been developed and completely dried, the lines which had previously been formed by the automatic drafting machine in the master 40 may be formed in the film 70 by an etching process, which process is also well known. This is accomplished with a suitable etching solution which is placed in contact with the coating 71. The etching solution is applied with a light pressure with a suitable brush or the like and then allowed to act on the coating 71. The etching solution will effect an etching of the coating 71 in the areas that were sensitized by light being transmitted through the lines on the master 40. In the areas that were not light-transmitting, no etching of the film 71 will occur. As a result of the etching process, a Peel Coat film is provided which is of exactly the same construction, in terms of lines formed thereon, identical to the lines formed by the automatic drafting machine on the Scribe Coat (See FIG. 7). Accordingly, a Peel Coat film is provided which has lines 50_a_–53_a_ corresponding to the lines 50–53 for the formation of severing lands, and lines 60_a_–63_a_ for formation of the creasing lands. For purposes of the present invention, and for reasons which will become apparent hereinbelow, two separate Peel Coat negatives are made by the process disclosed hereinabove. The one is designated 70 (FIG. 7) for subsequent use in making the male die 10, and the other designated 75 (FIG. 8) for subsequent use in making the female die 11.

Referring now to FIGS. 7, 7A, 7B and 7C which show the negative 70, the negative 70 has been exposed and etched, as described above. The Peel Coat 70 has the plurality of lines 50_a_, 51_a_, 52_a_ and 53_a_ which correspond with the lines 50–53 on the master 40. Likewise, the Peel Coat is provided with lines 60_a_, 61_a_, 62_a_ and 63_a_ which correspond with the lines 60–63 on the master 40. The lines 50_a_ and 51_a_ define an opaque area 76 therebetween. The lines 51_a_ and 52_a_ define a second opaque area 77, and the lines 52_a_ and 53_a_ define a third opaque area 78 therebetween. Likewise, the lines 60_a_–63_a_ define three opaque areas which are designated 80, 81 and 82. As described above, these areas are readily removable selectively from the base film of the Peel Coat. In other words, the surface material or coating 71 on the Peel Coat base sheet 72 is readily removable and peelable therefrom.

As seen in FIG. 7A, for purposes of forming the male creasing elements 14, the area 81 of FIG. 7 has been peeled from the negative 70, leaving the areas 80 and 82 and surrounding areas thereon. The lines 60*a* and 63*a* are superfluous to forming the area 81. The area 81 having been removed provides an area of the negative 70 which is light-transmitting and shaded to so illustrate, since the base sheet 72 of the Peel Coat 70 is of a light-transmitting material. As best shown in FIG. 7B, for purposes of forming the severing land on the male die, the opaque areas 76, 77 have both been removed from the base sheet of the Peel Coat film, leaving only the area 78 on one side of the line 54*a*, while on the other side of the line 54*a* the areas 77, 78 have been removed leaving only the area 76. Accordingly, the areas when removed provide a light-transmitting area, shown as shaded in FIG. 7B. The lines 53*a* and 54*a* are superfluous to forming this desired light transmitting area.

After the Peel Coat film 70 has been selectively peeled, as described above, it is used in the formation of the male die plate. To this end, a suitable metal plate is provided and the Peel Coat negative with the areas selectively peeled, as described above, is placed in an overlying registered relation to the metal die plate. The die plate is coated with a light-hardenable resist, as is well known, prior to the registered relationship being established. While registered, the light, hardenable resist is exposed through the film 70. Accordingly, the resist on the die plate will harden in the areas corresponding with the shaded areas in FIGS. 7A and 7B.

After the light hardenable resist on the die plate has been exposed to light, the die plate is etched by a suitable etching solution. The die will therefore be etched in the areas which are not light hardened. The etchant, however, has what may be termed a "cutaway" effect. In other words, the etchant acts not only on the surface of the material as it works down into and etches away part of the die plate, but it also acts laterally on side surfaces of the light-hardened areas and effects a reduction in the over-all width of those areas. As a result of this action, the severing lands 13 are etched on the die plate 10 as well as the creasing lands 14. The lines 60*a*, 63*a*, 53*a* and 54*a* which have been hardened on the die plate are superfluous to forming the desired land areas and are actually etched away due to the action of the etchant working laterally on the sides thereof due to the cutaway effect. They are originally of a width, e.g. 0.005 inch, such that they completely or nearly disappear from the die plate. See plate 10 in FIG. 9, where slight ridges remain, corresponding to lines 60*a* and 63*a*.

As noted hereinabove, the master negative 40 is used not only to expose the film 70 for purposes of making the male die 10, but it is also used for purposes of exposing the film 75 for making the female die 11. In this connection, many of the steps are similar except that the areas which are peeled from the Peel Coat 75 are different from the areas which are peeled from the Peel Coat 70. Of course, the Peel Coat 75 is formed in the manner described including the proper registry of the master 40 thereto and the exposure of the Peel Coat 75 through the master 40.

As shown in FIG. 8, the Peel Coat 75 is provided with four lines which are designated 50*b*–53*b* which correspond with the lines 50*a*–54*a* formed in the Peel Coat 70 and which further correspond with the lines 50–54 on the master 40. The film 75 also has lines 60*b*–64*b* which correspond with lines 60*a*–64*a* on the Peel Coat 70 and correspond with the lines 60–64 on the master 40. The lines 50*b* and 51*b* define an area 76*b* therebetween, the lines 51*b* and 52*b* define an area 77*b* therebetween, and the lines 52*b* and 53*b* define an area 78 therebetween, all of which correspond with the areas 76, 77, and 78 on the Peel Coat 70. Likewise, the lines 60*b*–63*b* define areas therebetween, designated 80*b*–82*b* corresponding to the areas 80–82 on the Peel Coat 70.

For purposes of making the female creasing lands, the areas 80*b* and 82*b* are peeled from the Peel Coat 75. As a result, this provides light-transmitting areas, as shown shaded in FIG. 8B. These shaded areas are spaced apart by the area 81*b* which has not been peeled from the Peel Coat 75. For purposes of making the severing land 22 on the female die 11, the areas 78*b* and 77*b* are peeled therefrom on one side of line 54*b*, while 76*b* and 77*b* are peeled on the other side of the line 54*b*, thereby forming a light-transmitting area which is shown shaded in FIG. 8A. The lines 50*b*, 53*b* and 54*b* are superfluous to forming the desired light transmitting area.

The Peel Coat 75 is then used in the formation of the female die. For purposes of forming the female die, the Peel Coat 75 is used in exposing a light-hardenable resist on a plate which is then etched, in the same manner as described above in connection with the etching of the plate exposed through the Peel Coat 70. As a result of the etching the female creasing lands 16 are formed thereon as well as the severing lands 22. Lines 50*b* and 54*b* are etched away, as described earlier.

FIG. 9 illustrates somewhat schematically, the present invention and the manner in which the etching solution acts upon the metal plates. As shown in FIG. 9 in the upper portion thereof, the Peel Coat 70 is illustrated with the lines 60*a*–63*a* etched therein and which define the areas 80–82. The area 81, as illustrated in the second step in the process, has been removed in order to provide the light-transmitting exposed area designated 77*c*. The Peel Coat is then exposed to expose the light hardenable resist on the metal plate which is to be used for formation of the die plate 10 and the die plate 10 is then etched as illustrated in the next step in FIG. 9. Dotted lines illustrate the action of the etchant in reducing the width of the land or exposed area due to the etchant acting on the sides of the land. This constitutes the afore-mentioned lateral cutaway action and which results in the hardened areas provided by lines 60*a*, 63*a* disappearing. The land which is formed there is designated 14 and constitutes the male creasing land on the die plate 10. Insofar as the severing elements are concerned, it should be equally clear that the severing elements are reduced in dimension due to the action of the etchant thereon. This reduction is compensated for originally in the spacing of the lines on the master 40 to provide the appropriate dimension 26 as shown in FIG. 2.

FIG. 9 also illustrates the Peel Coat 75 with areas for forming the creasing lands removed providing light-transmitting areas 90 and 91. The die plate 11 is illustrated and the dotted lines thereon indicate the lateral cutaway action of the etchant in forming lands 16.

FIG. 10 illustrates a portion of the final male die plate 10 in plan view while in a flat state. As shown in FIG. 10, the male die plate includes the severing elements 13 as well as the creasing elements 14 which are to form the score lines in the material. The creasing elements 14 are accurately positioned on the die plate as are the severing elements so that the creasing elements will cooperate with the creasing elements 16 on the female die plate 11. Likewise, as shown in enlargement in FIG. 10A, the severing elements 13 which are formed on the die plate 10 are shifted somewhat on the die plate in different areas. This shifting is well known for the purposes of preventing sticking of material in the die plates. In order to provide such shifting, the appropriate areas of the Peel Coat must be removed and some hand-working of the Scribe Coat is necessary, as illustrated by lines 54 of FIG. 6, and corresponding lines 54*a* and 54*b* of FIGS. 7B and 8A.

FIG. 11 illustrates the female die in plan view and, as shown, the female die does include a plurality of severing elements 22 which are formed thereon to cooperate with the severing elements 13. It should be apparent that the severing elements 22 on the die plate 11 are formed as the slightly offset mirror image of the severing elements 13 on the die plate 10, so that when the dies are placed together, the material is severed along the overlapped area thereof in accordance with the pattern that was provided by the draftsman. Likewise, it should be apparent that the female creasing elements 16 on the die plate 11 are formed so that the male creasing element 14 properly cooperates with those creasing elements and effects scoring of the material at the desired line. Likewise, as shown in FIG. 11A, the severing elements on the die plate 11 are offset similarly or in reverse manner to that shown in FIG. 10A, so as also to prevent a sticking of the material in the die plate 11, as discussed above in connection with the male die plate. The actual cut line of the carton is illustrated in dot-dash lines in FIGS. 10A and 11A. It will be noted that the dot-dash lines shift from one edge of a land to the other at what is normally termed a "crossover," symbolic of the lines 54 originally placed in master 40. This is done to enable better handling of cartons in carton folding machinery. It will not be discussed further herein, however, since this aspect is not essential to an explanation of the invention.

A modified embodiment of the present invention is illustrated in FIGS. 12A–13D. In the embodiment illustrated in FIGS. 12A–13D, instead of a single master 40 being formed on the automatic drafting machine, four Scribe Coat masters are formed on the automatic drafting machine. The four Scribe Coat masters are designated 100, 101, 102 and 103 in FIG. 12A. Each of these masters is illustrated specifically in FIGS. 13A–13D. The scribe Coat sheets 100–103 are made on the drafting machine by scribing (removing) portions of the coating on the light-transmitting base sheet of the Scribe Coat material, as described above in connection with the embodiment of FIG. 4. However, the width of the scribe which removes the material from the films 100–103 is varied, as should be apparent in the drawings and will be discussed below.

The material 100 has its coating removed in accordance with the programmed outline of the carton blank. The material 100 specifically has one line 110 formed therein which has a width of 0.005 inches. This line is located on the film 100 centrally with respect to the outline of the carton which is to be formed or centrally with respect to the cut line which is to be formed in the sheet material. The film 100 also has four lines formed thereon designated 105–108 respresentative of the creasing lines 60–63 of FIG. 6, for example.

The film 101 has a line 111 formed therein which has a 0.065 inch width. The film 102 is formed with a line 112 of 0.075 inch width. The film 103 is formed with a line 113 of 0.035 inch width. All of lines 110–114 are produced from the same program, as compared to the four offset programs used in the preparation of master 40 of FIG. 6.

After the four masters 100, 101, 102 and 103 are formed with the different width of lines thereon, the film 100 is used to produce a positive 115. Likewise, the film 101 is formed into a positive 116. The positive 116 is overlaid on the master 102 and suitable registry is provided therebetween, such as pin registry disclosed in U.S. Pat. No. 3,160,096. With the positive 116 overlaid on the film 102, the combination, designated 117, is exposed to form a positive 118. The positive 118 is provided with two lines thereon 120 and 121. Each of the lines is 0.005 inches in width. The positive 118 is then overlaid on and in registry with the positive 115 formed from the master 100. The combination thereof is designated 125. This combination is exposed to form a negative 126. The negative 126 then has three lines, designated 120, 110, 121, formed on it. Also, on the negative 126 are four lines which are designated 130, 131, 132 and 133, which are used to form the creasing lands. The negative 126 is handworked so as to provide stop lines similar to lines 54 and 64 of FIG. 6. One such stop line is designated 135 on the handworked negative 140.

The handworked negative 140 is then exposed to form two Peel Coat negatives, which are designated 141 and 142. The two negatives 141, 142 are identical in construction, as should be apparent from FIG. 12A. The negatives 141 and 142 are formed by the process described above in connection with the formation of the negative 70 and 75. In general, the process involves the exposing of the Peel Coat material and the etching of a portion of the material which became sensitized to light which was transmitted through the negative 140. After the negatives 141, 142 have been formed, it should be apparent that they are provided with a plurality of lines corresponding to the lines which are on the negative 126. For purposes of each of description, the lines which are on the negative 126 are given the same designation as on the negative 141, but with an "*a*" appended, and the same lines are given the same designation on the negative 142 with a "*b*" appended. The negatives 141, 142 are then used and selected areas are removed therefrom for purposes of making the final die plates.

The negative 141 is used in the formation of the male die plate 10. The negative 141 has its area 150 peeled therefrom as well as the area 151 which is defined by the lines 131a and 132a. The peeled negative 141 is designated 155 in the drawings with the areas 151 and 150 peeled therefrom. The area 150 which has been peeled has a width of 0.030 inches, and, accordingly, the negative 155 is provided with a light-transmitting area, designated 160, which has a lateral dimension of 0.040 inches. The area 151 which has been peeled from the Peel Coat 141 provides a light-transmitting area 161 on the Peel Coat 155 which functions in forming a male land for creasing.

The negative 155 is then made into a positive which is designated 165. The positive, of course, has opaque lines which correspond with the light-transmitting lines of the material 155. The positive 165 is then precisely registered to the master 103 to form the final negative for purposes of making the male die 10. More specifically, the film 103 is first formed into a positive which is designated 166. The positive 166 is overlaid in register with the positive 165. This combination is designated 170 in FIG. 12A. As a result of this overlay, the area bracketed and designated 113*a* corresponds with the area 113 of the master 103 and that area, as is noted is 0.035 inches. The area which is bracketed and designated 160*a* is the area which corresponds with the area 160 on the negative 155. The bracketed area 160a has a dimension of 0.040 inches. The area bracketed and designated 171 corresponds with the line 110 and is 0.005 inches in width.

The overlaid positives 165 and 166 are exposed to form the final negative 180 which is used in the formation of the male die 10. The negative 180 includes an area 181 which is light-transmitting and which has an area equal in width to 0.055 inches. The width of area 181 is equal to 0.040 inches (the width of 160) plus 0.0175 inches (1/2 the width of 113*a*) minus 0.0025 inches (1/2 the width of 110), as should be apparent. This, of course, is 0.055 inches.

The negative 180 is then used in the manner described above in connection with the embodiment of FIG. 4 for exposing a resist coating on a metal plate to make the male die. The light-transmitting areas effect a hardening of portions of the resist coating and the die plate is then etched in the conventional manner in order to form the lands. The cutting lands 13 will be formed from the area 181 and the creasing lands 14 will be formed from the area 161*a*. In the embodiment shown, the creasing land, of course, will be much narrower than the cutting land.

From the above, it should be apparent, however, that the edge 181*a* on the opaque area around the light-transmitting area 181 is controlled by and corresponds to the edge 113*b* of the master 103 and the lateral cutaway etching effect on the land formed therefrom is accurately controlled directly by the drafting machine, since the automatic drafting machine forms the line 113 on the master 103. Accordingly, a minimum chance of error on the one edge of the severing land may occur, which edge defines a boundary of the overlapping portion 26 of the dies 10, 11. This edge must be made precise for accurate dies. Thus by using the edge 113*b*, which never goes through the Peel Coat stage, any possibility of inaccuracy which may come about in chemical etching of Peel Coat negatives 141 and 142 is avoided. Such inaccuracy is possible due to strength of etchant, length of etching time on the Peel Coat, etc.

The negative 142 is used in the formation of the female die. With respect to the negative 142, the area 200 defined by the lines 110*b* and 121*b* is removed to form a light-transmitting area 201. The area 201 has a dimension of 0.040 inches in the example shown. Also, the areas 202 and 203 are removed for purposes of forming the female creasing lands 16. As a result, the negative 142 has light-transmitting areas 201 of 0.040 inches, and the line 120*b* which is also a light-transmitting area, of 0.005 inches. Moreover, for purposes of forming the creasing lands, the negative 142 has light-transmitting areas 205 and 206.

The negative 142 is then formed into a positive which is designated 210 and which corresponds with the negative 142 except that the light-transmitting areas are now not light-transmitting. The positive 210 is then combined with the positive 166, and this combination is designated generally 211 in FIG. 12A. When the positives 166 and 210 are overlaid, the center of the positive 166 corresponds with the center of the line 110*b*, which line forms a part of the area designated 215 in FIG. 12A. The portion of the area 215 which comprises the line 110b is bracketed and designated 214. The width of the area 215 is 0.040 inches.

When the overlaid positives 210 and 166 are exposed, a negative is formed which has a light-transmitting area designated 220. The light-transmitting area 220 is made up of the thickness of the line 121*b* (0.005 inches), the width of the peeled area 200 (0.030 inches), the width of the line 110*b* (0.005 inches), the width of one-half of 113 (0.0175 inches), minus one-half of the width of the line 110*b* (0.0025 inches). Accordingly, the total width of the area is equal to 0.055 inches which is identical to the width of the area 181. It should be apparent also, however, that the edge 220*a* of the area 220 on the negative 219 is controlled by the edge 113*c* of the master 103 and that, accordingly, the edge 220*a* is extremely accurately formed, due to the fact that the automatic drafting machine has formed the edge 113*c* on the master 103. Accordingly, a minimum of inaccuracy can occur with respect to the edge 220*a*. This edge defines the other boundary of the overlapping portion 26 of the severing lands on the dies 10,11.

The negative 219 is also used to expose a light hardenable resist on a metal plate and then to effect the etching of the metal plate. As described above, it is well known that the etchant provides a lateral narrowing (cutaway) of the lands as it etches the areas and, accordingly, the final lands do not have the dimensions of the areas 181 or 220, but rather have dimensioning which is less than that. Also, it is apparent that the etchant will act generally equally on the severing elements which are formed in each die, and, accordingly, the dies 10, 11 will have a precise overlapping area 26 (FIG. 2) for purposes of cutting. The creasing elements 14, 16 which are formed on the die plates through the use of the negatives 180 and 220 are formed in substantially the same manner as described above in connection with FIG. 4, and, accordingly, that description will not be repeated.

From the above, it should be apparent that applicant has provided a substantially improved, unique method of making a pair of cutting and creasing die plates 10, 11. The method may be applied to die plates of a variety of different constructions and designs and is not limited to any particular design. Also, it should be apparent that numerous modifications in the above-described methods may be provided. For example, while the description hereinabove with respect to the modification disclosed in FIGS. 1–11A provides for forming four lines in the Scribe Coat to form the master 40 by four operations of the drafting machine from input data, the same input data can be used for forming each line with appropriate programming for purposes of offsetting one line from the other, as is well known.

It should also be apparent that the drafting machine could be used to form a Scribe Coat negative which corresponds with the negative 140 in the embodiment of FIG. 12A and that that Scribe Coat could then be used as the negative for forming the Peel Coat negatives 141 and 142. In such a modified method, many steps in the formation of the negative 140 would be eliminated, since the negative 140 would be made directly by the drafting machine. Accordingly, in such a modified embodiment, the drafting machine would operate to form a Scribe Coat corresponding with 140 and the Scribe Coat 103; otherwise, the method disclosed in the embodiment of FIG. 12A would remain essentially the same.

Moreover, it is possible to perform the present invention by double exposing film through the Peel Coat 155 and Scribe Coat 103. When the double exposure has been made, the negative 180 results.

Also, it should be apparent that the negatives 141 and 142 are identical and that the Peel Coat negatives formed therefrom can be stored and reused for purposes of making another set of dies at a future time. In the event that such storage is not desirable or necessary, only one negative may be made. For example, assuming that only Peel Coat 141 is made, areas 150 and 161 may be peeled therefrom. A positive and a negative may then be made of the peeled film 141. The positive may be used in making the male negative 180. The negative 219 may be made by peeling areas of 141 corresponding with 200, 202, 203 and registering that with the positive that was previously made and exposing same.

In a still further modification of the present invention, the score lands can be made by forming a series of six spaced lines on the Scribe Coat. The six lines then are formed on the Peel Coat, and define five peelable areas. Selected areas are then peeled. By spacing the lines as desired and peeling the appropriate areas, the distance between the male and female lands in the plane of the material can be controlled for purposes of handling of different thicknesses of materials.

It should be apparent that a number of modifications in the present invention can be accomplished, and further modifications and adaptations of the present invention will not be described herein, but it is intended to cover such by the appended claims.

What is claimed is:

1. In a method of making die plates having a planned layout of lands thereon which project from a main body of the die plates and which cut and/or crease material, the steps of: (a) providing a sheet having a light transmitting base and an opaque coating thereon and making a master negative from said sheet by forming light transmitting lines in the coating to produce line images thereon and to define between said lines at least two areas on said opaque coating; (b) providing a sheet material comprising a light transmitting base sheet having a removable light-sensitive opaque coating thereon, exposing said sheet to light through said master negative to form line images defining at least two areas in said opaque coating corresponding to said line images defining said at least two areas in said master negative opaque coating; (c) removing coating from at least one but less than all of the areas defined by said lines in said first sheet to render at least one area thereof light transmitting and thereby to produce on said sheet an image of the planned layout of the lands on one of said die plates; (d) exposing a light hardenable resist coating on a plate in accordance with said image of the planned layout on said sheet to harden an area of the resist on said plate, and etching said plate in the unhardened areas thereof to produce a first of said die plates; (e) repeating steps (b), (c) and (d) with at least one other sheet material and at least one other plate to produce at least one other of said die plates.

2. A method as defined in claim 1 wherein said light transmitting lines are formed in said film by photographically exposing the film to the desired line images.

3. A method as defined in claim 2 wherein the step of forming the light transmitting lines in the sheet material coating includes the step of developing the coating photographically exposed to the desired line image and etching the photographically exposed and developed line images on the coating.

4. A method as defined in claim 1 wherein said light transmitting lines in said sheet material includes lines which are superfluous to defining those areas thereon which are rendered light transmitting by having the opaque film removed therefrom, and the hardened area of the resist on said plate includes line areas corresponding to such superfluous lines, and said line areas are removed from said plate by lateral cutaway etching action.

5. A method as defined in claim 1 wherein at least three line images are formed on the opaque coating to define said at least two areas.

6. A method as defined in claim 1 wherein said sheet material comprises a peelable coated film and said removing of said coating from said at least one area comprises peeling coating within said at least one area from said base sheet.

7. A method as defined in claim 6 wherein at least four line images are formed on the coating to define at least four selectively peelable areas.

8. A method as defined in claim 6 further including the steps of providing a pattern corresponding to the shape of the material to be formed by the die, storing input data in a drafting machine in accordance with the pattern, forming a transparency from the input data by operating the drafting machine in dependence upon the input data, and photographically exposing the peelable coating through said transparency.

9. A method as defined in claim 8 wherein the transparency comprises a light-transmitting base sheet having a removable coating thereon, said drafting machine having a tool for removing the coating from the base sheet in a smooth uniform line to form said line image layouts.

10. The method of claim 1 wherein coating is removed from said film by peeling the coating therefrom.

11. The method of claim 1 wherein two films and two plates are employed to form a male die plate and a female die plate.

12. The method of claim 11 wherein said light transmitting lines are formed in said film by photographically exposing the film coating to the desired line images in said master negative, the exposed coating is developed and the line images thereon are etched away.

13. In a method of making a pair of dies each having a planned layout of lands thereon which project from a main body of the die and which lands cooperate to cut and/or crease material located therebetween, the steps of providing a sheet having a light transmitting base and an opaque coating thereon, producing line image layouts on the sheet which lines define at least two areas therebetween corresponding to the planned layout of lands on the respective dies, transferring said line image layouts, respectively, to a pair of films comprising light transmitting base sheets having a peelable opaque coating thereon, removing a portion of the peelable opaque coating from one film by peeling it therefrom to render a portion thereof light transmitting and thereby to product a peeled film having thereon an image of the planned layout of the lands for one die, removing a different portion of the peelable opaque coating from the other film by peeling it therefrom to similarly produce thereon an image of the planned layout of lands for the other die, coating a first plate with a light-hardenable resist, exposing the resist coating on said first plate in accordance with the one peeled film to harden portions of the resist on the first plate corresponding to the image on the one film, etching the first plate in the unhardened areas to produce one die, coating a second plate with a light-hardenable resist, exposing the resist coating on said second plate in accordance with the other peeled film to harden portions of the resist on the second plate corresponding to the image on the other film, and etching the second plate in the unhardened areas to produce the other die.

14. A method as defined in claim 13 wherein said pair of sheets are exposed to form the image of at least three lines which define two selectively removable areas, removing one of the areas from one sheet and removing the other area from the other sheet.

15. A method as defined in claim 13 wherein first and second positives are made of said peeled films, said first and second positives being associated with a third positive having an area which overlies at least a portion of an area on each of said first and second positives corresponding to the peeled area plus a portion which overlies an additional area of the first and second positives, forming first and second negatives of the combination of said first and third positives and said second and third positives, respectively, exposing said resist on one plate through said first negative, and exposing said resist on the other plate through said second negative.

16. A method as defined in claim 15 wherein said third positive is made from a transparency formed by a drafting machine with a line image layout in accordance with the shape of the material to be formed.

17. A method as defined in claim 16 wherein said transparency comprises a light transmitting base sheet with a removable coating thereon, said drafting machine having a tool, and removing the coating with the tool to form the line image layout on the transparency.

18. In a method of making a pair of dies each having lands thereon which project from a main body of the die and which cut and/or crease material, the steps of providing a pattern corresponding to the shape of the material to be formed by the dies, providing a first film having a light transmitting base sheet with an opaque coating thereon, engaging the film with a tool for removing the coating from the base sheet, moving the tool in a path in dependence upon the pattern to remove the coating to a width of the tool in a smooth uniform line thereby providing a first transparency having light-transmitting lines and a relatively opaque background, coating a metal plate with a light-hardenable resist coating, exposing a peelable film on a light-transmitting base sheet through said transparency to form a line image layout on the peelable film, said line image layout including at least three lines defining two peelable areas therebetween, peeling at least one of said areas, and exposing said resist coating in accordance with at least a part of the peeled areas and with at least a part of the transparency to harden an area of the resist, and etching the metal plate of the unhardened areas.

19. In a method as defined in claim 18, further including making a pair of metal dies having severing lands which have an overlapping area in the plane of the material, providing said first transparency with at least three parallel light transmitting lines and forming a second transparency by removing a coating from the base sheet of a second film in a single line in dependence upon the pattern, with the width of the single line on the second transparency being greater than the width of the three parallel lines on the first transparency, forming two negatives from the first and second transparencies, exposing the resist coating on one die through the first transparency and exposing the resist coating on the other die through the second transparency.

20. In a method of making a pair of die plates having severing lands thereon where the lands partially overlap in the plane of the material severed, with the overlapping area defined by opposite lateral sides of the respective lands, the steps of, providing a pattern corresponding to the shape of the material to be formed by the dies, providing a first sheet of material having a light-transmitting base sheet with a coating thereon, removing the coating from the base sheet in dependence upon the pattern to provide accurately controlled boundaries between a lighttransmitting area and an opaque area which boundaries control said respective opposite lateral sides of the lands, coating a pair of metal plates with a light-hardenable resist, exposing the resist on one plate through a first negative having a light-transmitting area bounded by one of said accurately controlled boundaries for controlling the formation of one of said opposite lateral sides of one severing land on one die plate, exposing the resist on the other plate through a second negative having a light-transmitting area which at least partially overlaps the light-transmitting area of the first negative and is bounded by the other of said accurately controlled boundaries for controlling the formation of said other opposite lateral side of another severing land on the other die plate, and etching both of said plates to form said severing lands.

21. In a method as defined in claim 11 wherein said first and second negatives are made by providing a second sheet of material having a light transmitting base sheet and a removable coating thereon, removing the coating from the second sheet to form a transparency having at least three light-transmitting parallel lines thereon, defining two spaced areas therebetween, forming a pair of negatives corresponding to said transparency and having a light-transmitting base sheet with a pair of peelable areas defined by said lines peeling one of said areas from one transparency, combining said peeled one transparency with said first transparency and exposing the combination to make said first negative, peeling the other of said areas from the other transparency, combining said peeled other transparency with said first transparency, and exposing the combination to make said second negative.

22. In a method as defined in claim 11 wherein the removal of said coating is effected by engaging the coating with a tool of an automatic drafting machine storing input data in the drafting machine in accordance with the pattern, moving the tool in a controlled manner by the automatic drafting machine to remove the coating in dependence upon the pattern.

23. In a method of making a die having lands thereon which project from a main body of the die and which cut and/or crease material, the steps of providing a pattern corresponding to the shape of the material to be formed by the die, storing input data in a drafting machine in accordance with the pattern, coating a metal member with a light hardenable resist, operating the drafting machine in accordance with the input data to make a transparency by removal of an opaque coating from a light-transmitting base sheet to provide a plurality of light transmitting lines thereon, forming peel coat transparencies in dependence upon the transparency made by operation of the drafting machine, the peel coat transparencies comprising an opaque film having light transmitting lines formed thereon which define at least one area on the peel coat which is rendered light transmitting by removing film therefrom, exposing the resist coating in dependence upon the peel coat transparency to harden an area of the resist in accordance with the input data relating to the pattern, and etching the metal member in the unhardened areas.

24. A method as defined in claim 23 further including removing film from said peel coat transparency from fewer than all the areas defined by said lines.

25. A method of making male and female dies having lands thereon which project from the main bodies of the dies comprising:

a. providing an original bearing original line areas corresponding to lands to be provided on the male and female dies, said original line areas having a thickness approximately equal to the thickness of the lands to be produced on the male and female dies;
b. providing a sheet of material having a transparent layer and an opaque layer;
c. inscribing thin lines on said sheet of material to form a master negative, said thin lines being inscribed through said opaque layer to said transparent layer whereby said sheet of material is rendered transparent in the areas of said thin lines, said thin lines being located at the boundaries of said original lines and being much thinner than said original line areas;
d. providing a male die plate negative material having a light sensitive opaque layer and a transparent layer;
e. photographically processing the opaque layer of said male die plate negative material to form clear thin lines corresponding to all of the thin lines of said master negative;
f. making a male die plate negative by clarifying the opaque area between two adjacent thin lines of said male die plate negative material corresponding to the boundaries of all of the male land areas of said original to provide a male die plate negative transparent in said areas corresponding to all of said lines and opaque in areas between two adjacent said lines corresponding to the boundaries of all of the male land areas of said original;
g. photographically exposing a male resist element to said male die plate negative;
h. etching the exposed male resist element to produce a male die plate element, said processing being such that the lines formed in said male resist corresponding to thin lines present on said male die plate negative and not forming a boundary of said male land areas of the original are substantially removed by lateral cut away action of the etchant;
i. providing a female die plate negative material having a light sensitive opaque layer and a transparent layer;
j. photographically processing the opaque layer of said female die plate negative material to form clear thin lines corresponding to all of the thin lines of said master negative;
k. making a female die plate negative by clarifying the opaque area between two adjacent thin lines of said female die plate negative material corresponding to the boundaries of all of the female land areas of said original to provide a female die plate negative transparent in said areas corresponding to all of said lines and opaque in areas between two adjacent said lines corresponding to the boundaries of all of the female land areas of said original;
l. photographically exposing a female resist element to said female die plate negative;
m. etching the exposed female resist element to produce a female die plate element, said processing being such that the lines formed in said female resist corresponding to thin lines present on said female die plate negative and not forming a boundary of said female land areas of the original are substantially removed by lateral cut away action of the etchant; and the steps represented by steps (i) through (m) being performed either before, after, or at the same time as steps (d) through (h).

26. In a method of making a pair of dies each having a planned layout of lands thereon which project from a main body of the die and which lands cooperate to cut and/or crease material located therebetween, the steps of providing a pair of sheets of material having a base and a peelable film thereon which is light-sensitive, exposing each of the sheets to light to produce line image layouts on the material which lines define at least two areas therebetween corresponding to the planned layout of lands on the respective dies, removing a portion of the peelable film from one sheet of material to render some but not all of the said at least two areas thereon transparent and thereby produce an image of the planned layout of the lands for one die, removing a different portion of the peelable film from the other sheet of material to render some but not all of the said at least two areas thereon transparent and thereby produce an image of the planned layout of lands for the other die, coating a first plate with a light-hardenable resist, exposing the resist coating on said first plate in accordance with the first image to harden portions of the resist on the first plate, etching the first plate in the unhardended areas to produce one die, coating a second plate with a light-hardenable resist, exposing the resist coating on said second plate in accordance with the second image to harden portions of the resist on the second plate, and etching the second plate in the unhardened areas to produce the other die.

27. A method as set forth in claim 25, wherein the step of forming the light transmitting areas of the master document includes the step of forming a single pattern of light transmitting areas, wherein the step of forming the first negative includes the steps of forming a positive of said single pattern on a first sheet of peelable film, and wherein the step of forming the second negative includes the step of forming a positive of said single pattern on a second sheet of peelable film.

28. In a method of making die plates having a planned layout of lands thereon which project from a main body of the die and which cut and/or crease material, the steps of: making a master negative from a sheet having a light transmitting base and an opaque coating thereon by forming light transmitting lines in the film to produce thereon line images which define at least two areas thereon; respectively exposing a first and a second sheet material each comprising a light transmitting base sheet having a removable opaque film thereon through said master negative to form line images defining areas on the opaque films of said first and second sheet material which correspond to the line images on said master negative; removing film from at least one area defined by said lines on said first sheet and from at least one other area defined by said lines on said second sheet to render the areas from which film is removed from said sheets light transmitting and thereby to produce on said sheets respective images of the planned layout of the lands on the die plates; exposing a light hardenable resist coating on respective plates in accordance with the respective images of the planned layouts on said sheets to harden corresponding areas on the respective resist coatings; and etching the respective plates in the unhardened areas to respectively produce thereon said planner layouts of lands.

29. A method as defined in claim 28 wherein opaque coating is removed from selected areas of said first sheet to form an image of the planned layout of the lands of a male die and opaque coating is removed from selected areas of said second sheet to form an image of the planned layout of the lands of a female die corresponding to said male die.

30. The method of claim 20 wherein said coating is removed from said base sheet in dependence upon the pattern by engaging the coating with a tool of an automatic drafting machine having input data stored therein in accordance with the pattern, moving the tool in a controlled manner by the automatic drafting machine to remove the coating in dependence upon the pattern to provide a pair of said accurately controlled boundaries between a light transmitting area and an opaque area; said first negative is made by the steps of providing a second sheet of material having a light transmitting base sheet and a removable coating thereon, removing the coating from the second sheet of material to form a first transparency having at least three light transmitting parallel lines thereon which define two spaced areas therebetween in accordance with the pattern, forming a pair of negatives corresponding to said first transparency and having a light transmitting base sheet with a pair of peelable areas defined by said lines, peeling one of said areas from one of said negatives, and combining the peeled negative with said first transparency to make said first negative; and said second negative is made by the steps of peeling the other of said areas from the other negative, combining the peeled other negative with said first transparency and exposing the combination to make said second negative.

* * * * *

UNITED STATES PATENT OFFICE

CERTIFICATE OF CORRECTION

Patent No. 3,895,947 Dated July 22, 1975

Inventor(s) Albert J. Sarka

It is certified that error appears in the above-identified patent and that said Letters Patent are hereby corrected as shown below:

In claim 13, line 15, delete "product" and add --produce--.

Signed and Sealed this

*twenty-fourth* Day of *February 1976*

[SEAL]

*Attest:*

RUTH C. MASON
*Attesting Officer*

C. MARSHALL DANN
*Commissioner of Patents and Trademarks*